United States Patent [19]

Petrehn

[11] Patent Number: 4,619,422

[45] Date of Patent: Oct. 28, 1986

[54] BALLOON CARRIAGE

[76] Inventor: John R. Petrehn, 11876 W. 91st St., Overland Park, Kans. 66214

[21] Appl. No.: 568,825

[22] Filed: Jan. 6, 1984

[51] Int. Cl.[4] ............................................. B64B 1/40
[52] U.S. Cl. .................................... 244/127; 244/31; 244/94; 244/97
[58] Field of Search ..................... 244/94, 97, 98, 140, 244/141, 127, 30, 31, 32, 118.5

[56] References Cited

U.S. PATENT DOCUMENTS

| | | |
|---|---|---|
| 996,361 | 6/1911 | Rectenwald ........................ 244/31 |
| 1,023,759 | 4/1912 | Rectenwald ........................ 244/31 |
| 1,359,689 | 11/1920 | Gammeter ........................ 244/140 |
| 1,538,974 | 5/1925 | Cray ..................................... 244/94 |
| 2,950,881 | 8/1960 | Schwoebel . |
| 2,950,882 | 8/1960 | Yost . |
| 2,993,663 | 7/1961 | Froehlich et al. . |
| 3,121,451 | 2/1964 | Schuerch . |
| 3,131,889 | 5/1964 | Yost ..................................... 244/31 |
| 3,176,935 | 4/1965 | White et al. . |
| 3,458,161 | 7/1969 | Pohl et al. ........................... 244/32 |

FOREIGN PATENT DOCUMENTS 76576  10/1893  Fed. Rep. of Germany ........ 244/98

Primary Examiner—Galen Barefoot
Attorney, Agent, or Firm—Litman, Day and McMahon

[57] ABSTRACT

A gondola for a hot air balloon utilizes a rigid carriage with external and internal walls forming an enclosure with a central opening sized for accommodation of crew members. A platform extends across and closes a bottom of the central opening. The external and internal walls are spaced and form an internal and integral reservoir for the carriage for storage of fuel for powering the hot air balloon. In one embodiment, a crew module accompanies the carriage, and the carriage is arranged for jetisoning in emergencies.

2 Claims, 13 Drawing Figures

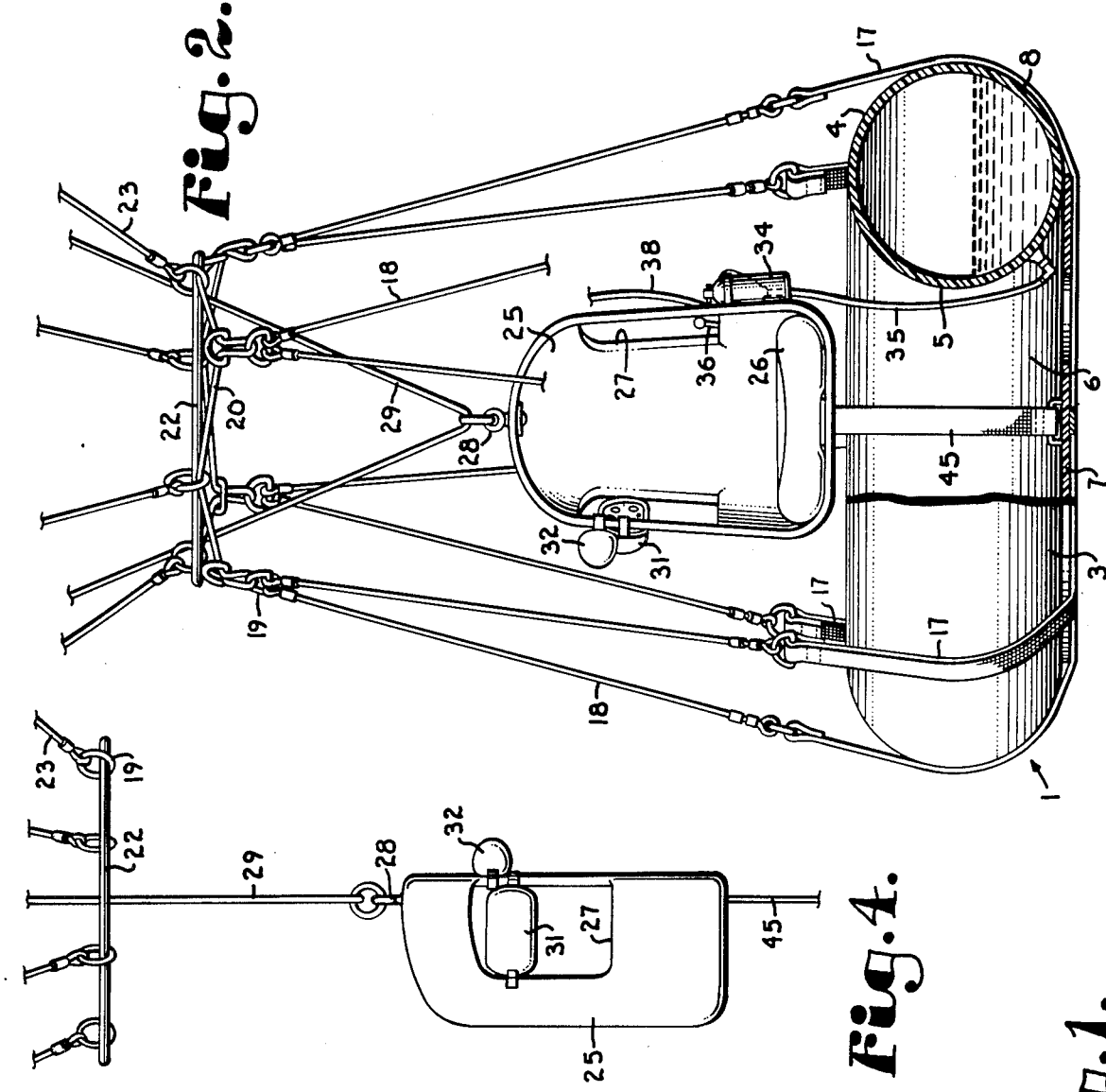
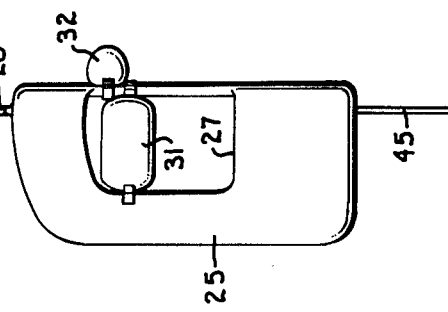
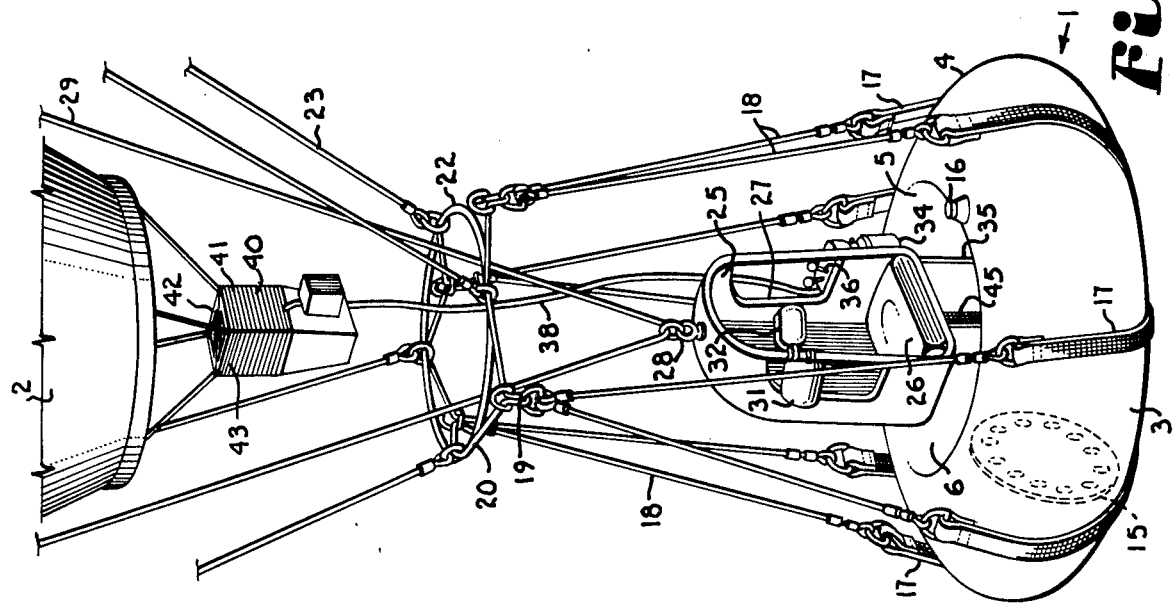

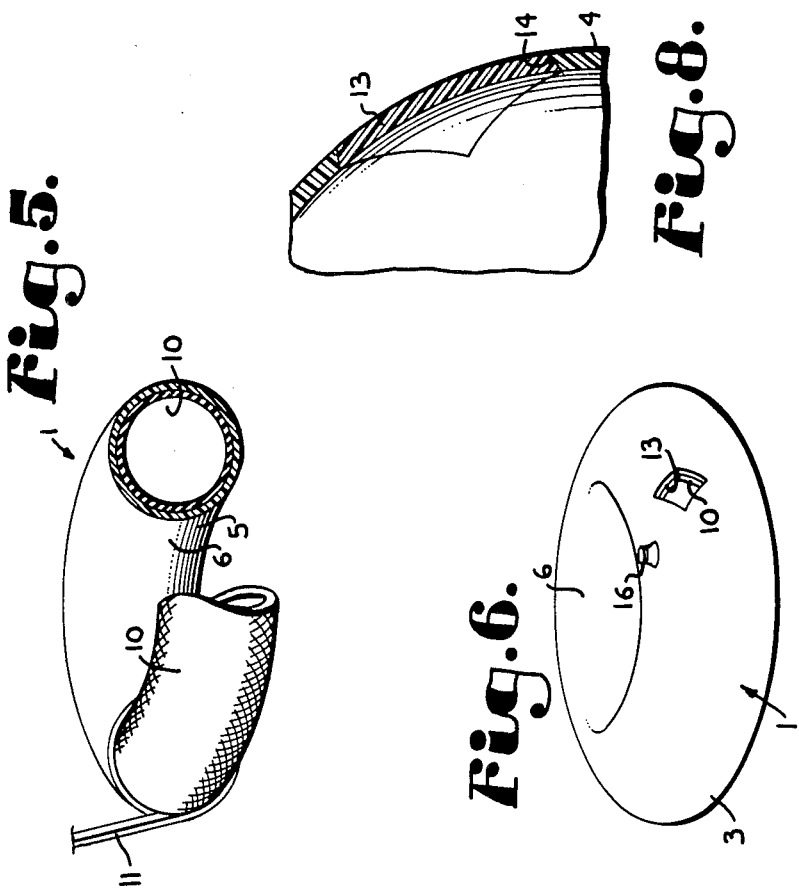
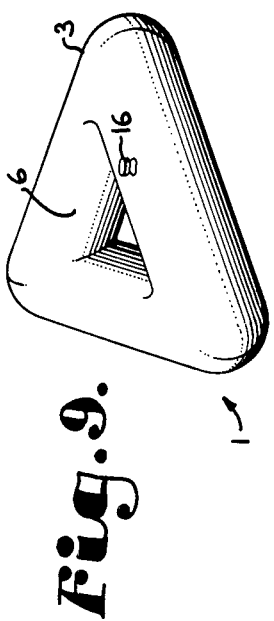
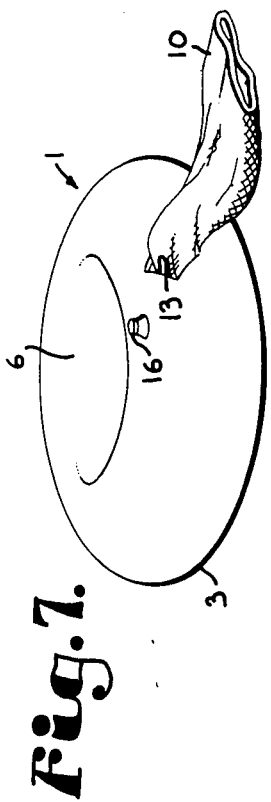
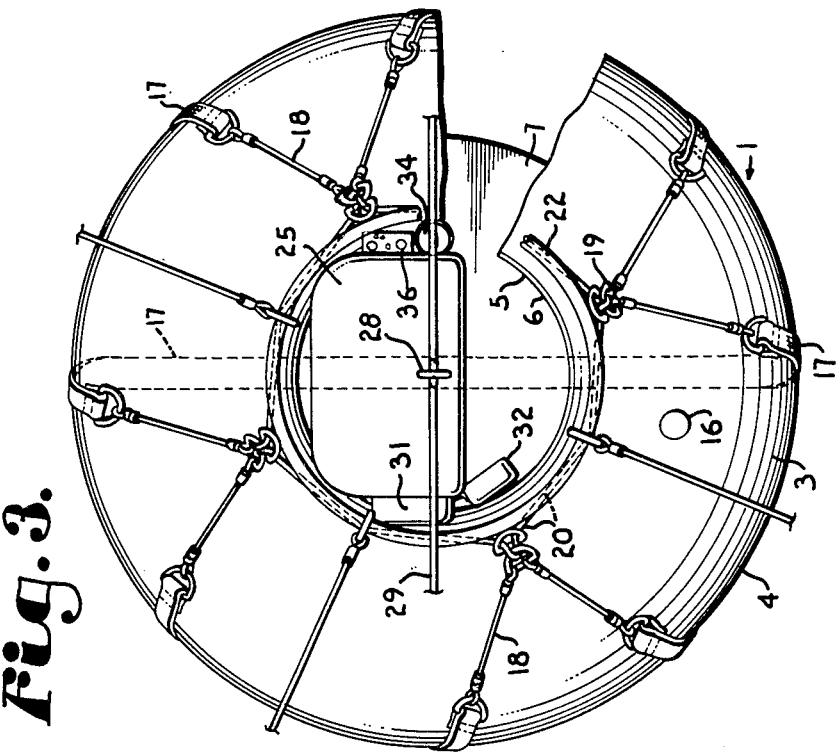

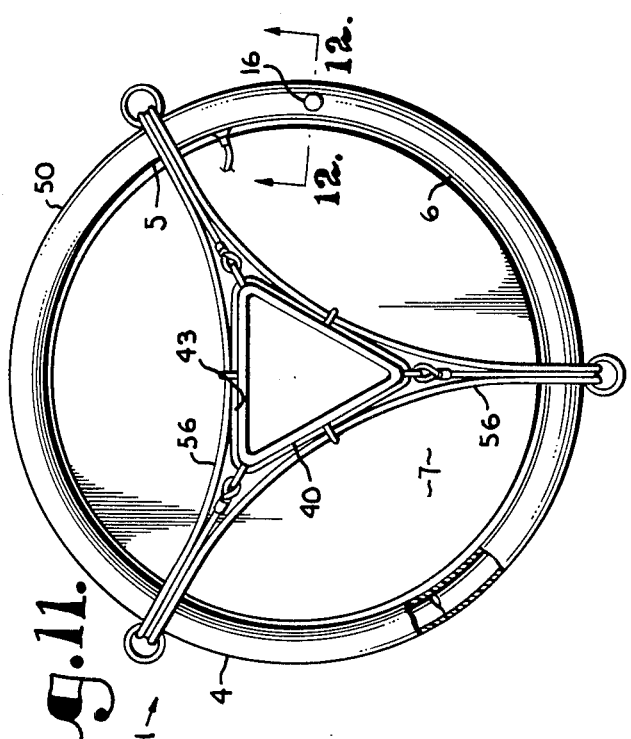
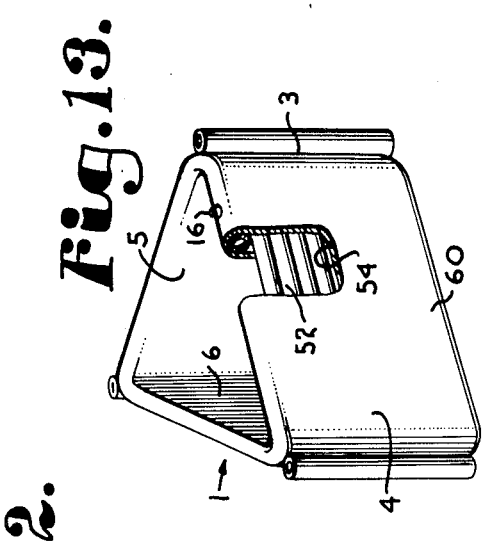
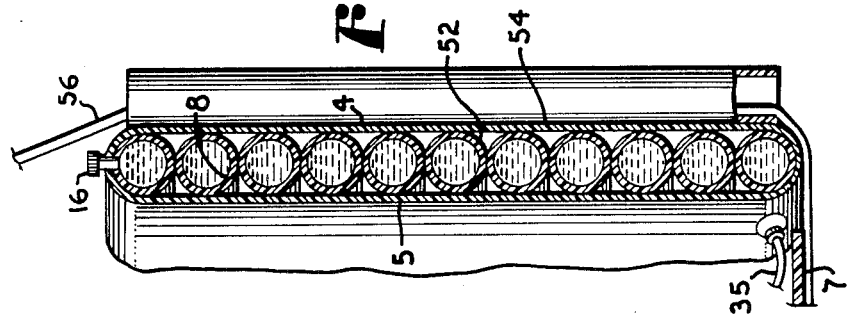
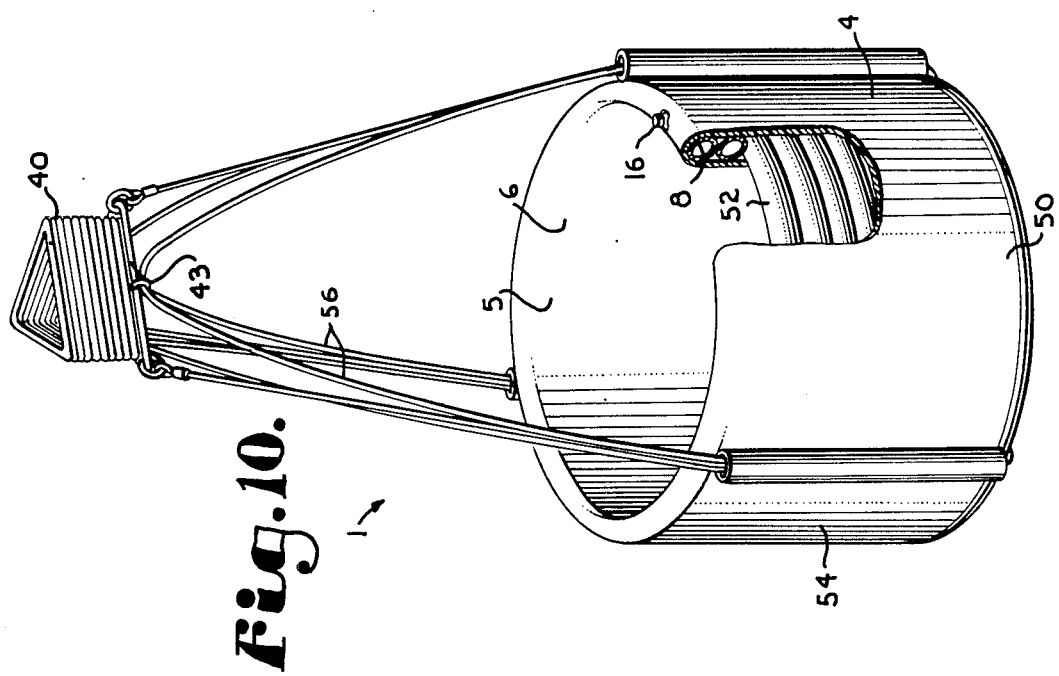

BALLOON CARRIAGE

This invention relates to carriages or gondolas for hot air balloons and in particular, to a carriage which includes a fuel supply.

BACKGROUND OF THE INVENTION

Hot air ballooning, while a relatively safe sport, is not without attendant hazards, most of which involve inadvertent ignition of the fuel carried in the carriage for the purpose of burning and heating the air used to create relatively lower density conditions in the balloon envelope. Presently, hot air balloons overwhelmingly use wicker basket carriages into which are set one or more metal tanks containing liquid propane. If the wicker basket is involved in a crash, the propane tanks are often tossed about and various fittings may rupture to leak the gas, sometimes with disastrous consequences. In other instances, the wicker baskets have come into contact with high voltage electrical lines and massive passage of current into the propane tank may cause the tank to explode.

Yet another problem associated with the use of the standard wicker basket with one or more propane tanks is that the carriage is simply unable to hold enough individual tanks for sustained flight of many hours or days in duration. Trade-offs of crew member area for fuel capacity is necessitated, particularly wherein three relatively heavy crew members are in the standard basket during summertime or high ambient air temperature conditions, and large amoumts of fuel must be burned to sustain a sufficient pressure differential within the envelope to offset the weight of the envelope, basket and crew. This normally makes for flight of unfortunately short duration.

Additionally, the standard wicker basket is not jetisonible if an emergency is encountered, such as severe leakage of the propane tanks or explosion and fire caused by hitting high voltage lines. The present disclosure provides such a crew module in conjunction with a jetisonible carriage for emergency use.

OBJECTS OF THE INVENTION

The principal objects of the present invention are: to provide a hot air balloon carriage having an internal, integral reservoir for containing a quantity of fuel for powering the balloon; to provide such a carriage which is strongly made and reinforced against rupture; to provide such a carriage which is composed of nonconductive material for significantly improved safety against collision with high voltage electrical lines; to provide such a carriage which is arranged for jetisoning and has an accompanying crew module for emergency use; to provide such a carriage having internal and external walls composed of a plurality of annular wrappings of synthetic material impregnated with resin to provide a sturdy, crush resistant structure; to provide such a balloon carriage having internal baffles to prevent fuel sloshing; to provide such a balloon carriage which has a spiral of internal piping which acts as a fuel storage reservoir; and to provide such a balloon carriage which is relatively inexpensive, sturdy and efficient in use, and particularly well adapted for the intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE DRAWINGS

FIG. 1 is a perspective view showing a balloon carriage or gondola embodying the present invention, attached to a hot air balloon and using an escape crew module.

FIG. 2 is an enlarged, fragmentary, elevational view of the balloon carriage, crew module and rigging.

FIG. 3 is a top view taken along lines 3—3, FIG. 2.

FIG. 4 is an end elevational view showing the escape crew module.

FIG. 5 is a perspective view showing a first step in the manufacture of the balloon carriage.

FIG. 6 is a perspective view showing a second step in the manufacture of the balloon carriage.

FIG. 7 is a perspective view showing a third step in the manufacture of the balloon carriage.

FIG. 8 is an enlarged, fragmentary view showing an opening in a side of the balloon carriage.

FIG. 9 is a perspective view showing a modified form of the balloon carriage.

FIG. 10 is a perspective view showing a second modified form of the balloon carriage.

FIG. 11 is a top plan view of the second modified form of the balloon carriage.

FIG. 12 is a sectional view taken along lines 12—12, FIG. 11.

FIG. 13 is a third modified form of the balloon carriage.

DESCRIPTION OF THE PREFERRED AND ALTERNATE EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1, generally indicates a gondola for a hot air balloon 2 comprising a rigid carriage 3 with external and internal walls 4 and 5 forming an enclosure surrounding a central opening 6 sized for accommodation of crew members. A platform 7, FIG. 2, forms a floor for the carriage. The external and internal walls 4 and 5 are spaced from each other and form an internal and integral reservoir 8 for storage of fuel for powering the hot air balloon 2.

In the illustrated example, the carriage 3 is in the form of a toroid and one method of formation of same is to utilize a large truck tire inner tube 10, FIG. 5, as an internal mold. A plurality of windings 11 are spirally wrapped around the tube 10 until the tube is entirely encased within the protective structure of the windings. Preferably, the windings are of a synthetic material of great strength, such as Aramid fibers, or Kevlar, produced by the DuPont Chemical Company of Wilmington, Del. and which are resin impregnated after winding to form an extremely hard, impact resistive and electronically nonconductive shell about the inner tube 10. Preferably, several layers of such windings 11 are formed so that the resultant shell is approximately one-half inch in thickness. The use of resin impregnated Aramid fibers is also preferred because of the resultant relatively low weight, high strength structure which is fluid impervious and may be used as a reservoir or tank. Preferably, the interior surface of the carriage 3 is coated with Teflon (a trademark for a coating substance made by DuPont Chemical Corporation) or other suitable non-permeable substance prior to closure.

The conventional fuel used by hot air balloons is propane, and as the neopreme material comprising the usual inner tube degrades upon contact with propane, preferably the inner tube 10 is removed after hardening of the windings 11. In order to remove the tube 10, an opening 1e is cut in the side of the carriage 3, and the inner tube 10 pulled outwardly through the opening 13. Preferably, the opening 13, FIGS. 6 and 7, is diamond shaped and has edges 14 which diverge inwardly, FIG. 8. After removing the tube 10 through the opening 13, FIG. 7, the removed piece is equipped with necessary valves and cemented in place. The inwardly diverging edges 14 of the opening 13 join with the according edges of the removed piece whereupon the application of internal pressure, the patched area tends to bind more tightly because of the diverging edge configuration.

In the form shown in FIGS. 1 through 8, the toroidal form is shown, however, it is to be understood that the carriage 3 may be in various forms such as rectangular, square or triangular, FIG. 9, wherein each of the shapes forms a carriage with internal and external walls 4 and 5 providing an internal and integral reservoir 8.

Appropriate baffles 15 are emplaced to prevent excessive fuel sloshing and fittings 16, FIG. 1, are provided for filling the reservoir 8. The platform 7, FIGS. 2 and 3, in the illustrated example, is circular and preferably of a transparent material, such as plexiglass, so that the crew may see below. The platform 7 is affixed to the carriage 3 such as by suitable adhesive and a system of load straps 17 which cross below the platform 7. The load straps 17 are affixed to support cables 18 which extend upwardly from the load straps 17 and are attached via a system of caribeaners 19 to a jetison cable 20 which when severed, permits the support cables 18 to pull free from the caribeaners 19 and the carriage 3 is thereby jetisoned from the balloon 2. The caribeaners 19 are also attached to a girdle or suspension ring 22 to which the main balloon suspension cables 23 are attached.

The invention also includes an emergency escape crew module 25 which may be used in conjunction with the carriage 3. The crew module 25 is generally in the shape of a suspended basket and has a seating surface 26, side viewing windows 27 and an upper ring mount 28 to which the crew module 25 is secured by a chair suspension cable system 29.

Preferably, the crew module 25 includes such safety features such as instrument packages 31 and 32 containing vapor catalytic gauges, pressure gauge, a pressure regulator, a thermostat, vapor pressure gauges and liquid pressure gauges. A fuel vaporization tank 34 is affixed to a side of the crew module 25, connected via a hose 35 to the reservoir 8 whereby liquid fuel is drawn off from the reservoir and vaporized in the tank 34. A control valve 36 is arranged for manipulation by a crew member seated in the module 25 and vaporized fuel is carried via line 38 to a burner assembly 40 consisting of two burners 41 and 42 in side-by-side arrangement and held in a burner support 43.

The fuel vaporization tank 34 serves as an emergency fuel source, as when the carriage 3 is jetisoned from the balloon 2 and crew module 25, for the tank 34 carries sufficient residual fuel which is used by the burner assembly 40 for a limited time to ensure a safe landing.

A hold-down strap 45 extends from the bottom of the crew module 25 to the platform 7 to prevent undue swaying of the crew module 25 relative to the carriage 3. Upon jetisoning of the carriage 3 during an emergency, the hold-down strap is designed to either be severed by the crew member or its attachment points are designed to break free or tear out to facilitate separation of the carriage 3 from the crew module 25. Note that the chair suspension cable system 29 is connected to the balloon 2 independently of the suspension cables 23 extending from the carriage 3 to the balloon 2. Thus, upon severing of any part of the jettison cable 20, the carriage 3 pulls away from the girdle or suspension ring 22, leaving the crew module 25 attached to the balloon 2.

In another embodiment of the concept of a carriage utilizing an integral and internal reservoir, FIGS. 10 through 12 disclose a carriage 50 also having external and internal walls 4 and 5 with a central opening 6 and a bottom platform 7. The internal reservoir 8 is formed by a spiral of piping 52. Preferably, the piping 52 is polyethylene pipe of hydraulic design and specifically designed for high burst pressure. The polyethylene pipe is able to withstand sigificant internal pressure differential, on the order of 50 p.s.i., without leakage. The piping has a hollow interior 53 for containing fuel. In the shape shown in FIGS. 10, 11 and 12, the piping is formed in a circular spiral and wrapped by a plurality of windings 11 of the aforementioned fiberglass or Aramid fiber material, impregnated with resin and allowed to harden to form a tough, high strength outer shell 54. The interior surface of the piping is coated with Teflon (a product of DuPont) or other suitable non-permeable substance before closure. Appropriate fittings 16 lead through the outer shell 54 and into the piping 52 for filling the internal reservoir 8 and a hose 35 is suitably connected to withdraw fluid for use by the burner system 40, FIG. 10. Burner supports 56 such as in the form of pipe hoops are triangularly arranged about the carriage 50 and support the burner assembly 40.

An alternative embodiment is shown in FIG. 13 comprising a carriage 60 utilizing a triangularly arranged spiral of piping 52. Other shapes, such as rectangles, squares, ovals and the like may be employed if desired.

It is to be understood that while certain forms of the present invention have been illustrated and described herein, it is not to be limited to the specific forms or arrangement of parts described and shown.

What is claimed and desired to be secured by Letters Patent is as follows:

1. A gondola arrangement for a hot air balloon comprising:
   (a) a rigid toroidal carriage formed of windings of synthetic fibrous material coated with resin and having external and internal walls forming an enclosure; said enclosure providing a central opening and said walls defining an internal and integral reservoir for storage of fuel for said balloon;
   (b) a floor extending across said central openings for supporting a crew;

(c) carriage support lines extending from said carriage to said balloon and routed through a circular girdle with a jettison cable whereby severing part of said jettison cable provides for jettisoning of said carriage; and (d) a crew module connected to said balloon by module support lines separate from said jettison cable and said carriage support lines and positioned between said balloon and said carriage;

(e) said crew module having a reserve fuel supply and a burner for providing heated air for said balloon for emergency use upon jettisoning said carriage.

2. A gondola arrangement for a hot air balloon comprising:

(a) a rigid carriage formed of a plurality of coils of piping atop one another and bound together by windings of synthetic fibrous material coated with a hardened resin and forming a wall bounding a central opening, said wall defining an internal and integral reservoir for storage of fuel for said balloon;

(b) a floor extending across said central opening for supporting a crew;

(c) carriage support lines extending from said carriage to said balloon and routed through a circular girdle with a jettison cable, whereby severing said jettison cable provides for jettisoning said carriage;

(d) a crew module connected to said balloon by module support lines separate from said jettison cable and said carriage support lines and positioned between said balloon and said carriage; and, (e) said crew module having a reserve fuel supply and a burner for providing heated air for said balloon for emergency use upon jettisoning said carriage.

* * * * *